United States Patent
Daneau et al.

(10) Patent No.: US 7,308,354 B2
(45) Date of Patent: Dec. 11, 2007

(54) METHOD OF CONTROLLING ELEMENTS USED TO EXECUTE ELEMENTARY FUNCTIONS OF AN INTERNAL COMBUSTION ENGINE

(75) Inventors: Marc Daneau, Boulogne Billancourt (FR); Bernard Dionnet, Morigny-Champigny (FR); Xavier Gruson, Paris (FR); Philippe Pelletier, Lardy (FR)

(73) Assignee: Renault s.a.s., Boulogne Billancourt (FR)

( * ) Notice: Subject to any disclaimer, the term of this patent is extended or adjusted under 35 U.S.C. 154(b) by 204 days.

(21) Appl. No.: 10/539,616

(22) PCT Filed: Dec. 12, 2003

(86) PCT No.: PCT/FR03/03694

§ 371 (c)(1),
(2), (4) Date: Nov. 17, 2005

(87) PCT Pub. No.: WO2004/065774

PCT Pub. Date: Aug. 5, 2004

(65) Prior Publication Data

US 2006/0212210 A1    Sep. 21, 2006

(30) Foreign Application Priority Data

Dec. 18, 2002    (FR) ................................. 02 16128

(51) Int. Cl.
*F02D 41/14* (2006.01)

(52) U.S. Cl. .................... 701/109; 701/114; 123/674

(58) Field of Classification Search ................ 701/109, 701/108, 102, 114, 115, 93; 123/674, 478, 123/480
See application file for complete search history.

(56) References Cited

U.S. PATENT DOCUMENTS

| 3,960,118 | A | * | 6/1976 | Konomi et al. ............. 123/698 |
| 4,465,051 | A | * | 8/1984 | Hasegawa ................... 123/478 |
| 4,546,747 | A | | 10/1985 | Kobayashi et al. |
| 4,766,871 | A | * | 8/1988 | Lefevre et al. ............. 123/684 |
| 5,029,090 | A | * | 7/1991 | Kuhn et al. ................... 701/93 |
| 5,158,062 | A | * | 10/1992 | Chen .......................... 123/674 |

FOREIGN PATENT DOCUMENTS

| DE | 195 45 706 | | 6/1997 |
| DE | 199 11 664 | | 9/2000 |
| DE | 100 20 448 | | 10/2001 |
| DE | 10 2004 048 078 A1 | * | 4/2006 |
| EP | 1 079 090 | | 2/2001 |
| FR | 2 772 427 | | 6/1999 |

* cited by examiner

*Primary Examiner*—Hieu T. Vo
(74) *Attorney, Agent, or Firm*—Oblon, Spivak, McClelland, Maier & Neustadt, P.C.

(57) ABSTRACT

A method of controlling elements used to execute the elementary functions of internal combustion engines. The method controls the elements using measurement signals provided by sensors, determines theoretical signals that have to be provided by reference sensors at a current operating point of the engine, determines deviations between the theoretical signals and the signals measured by the reference sensors, and establishes signal correction instructions for the elements according to the determined deviations.

10 Claims, 2 Drawing Sheets

Figure 1:
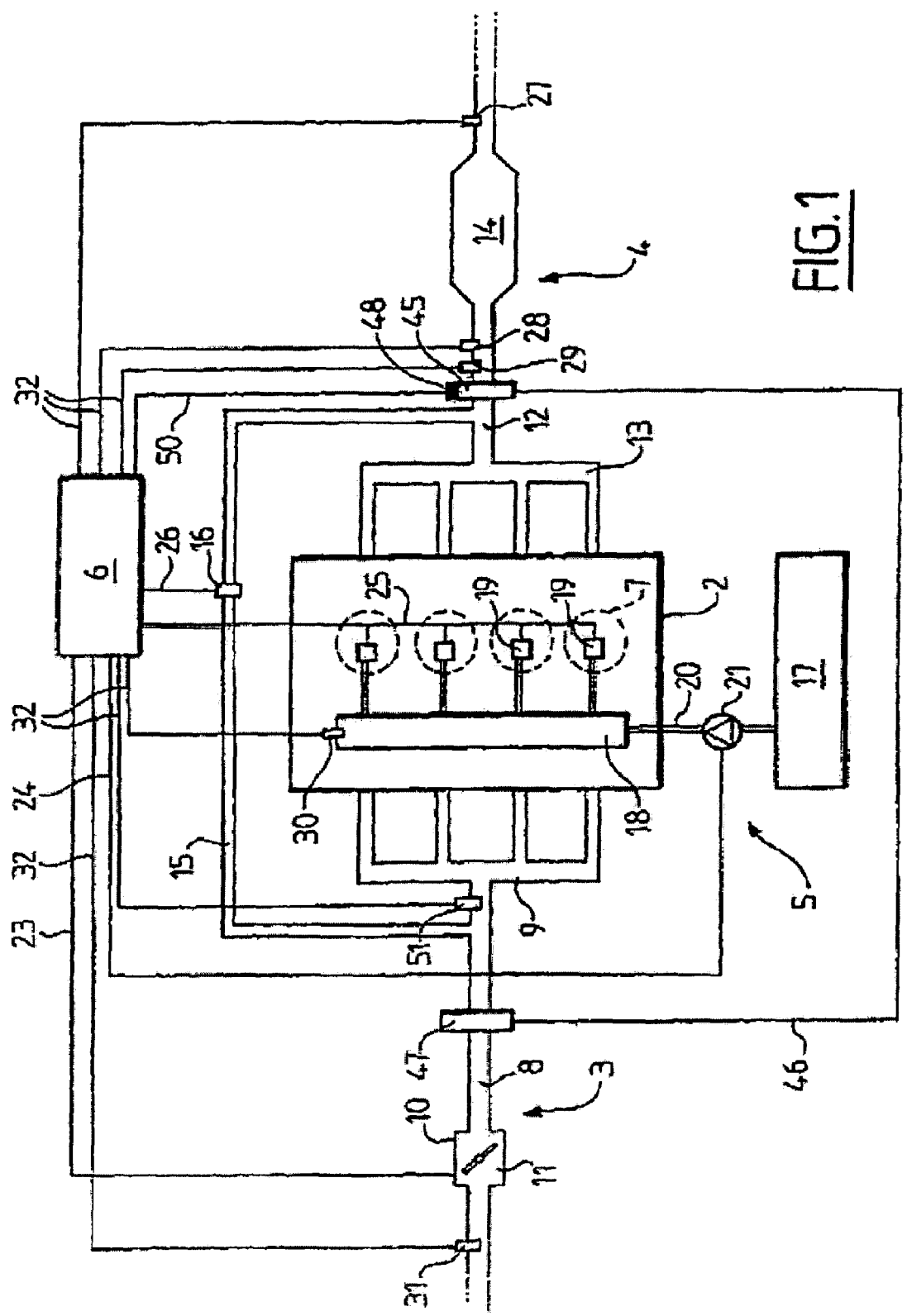

METHOD OF CONTROLLING ELEMENTS USED TO EXECUTE ELEMENTARY FUNCTIONS OF AN INTERNAL COMBUSTION ENGINE

The present invention relates to a method for controlling elements that execute elementary functions of an internal combustion engine.

Monitoring and control of the operation of the engine are effected by means of elements, such as actuators and sensors, that execute elementary functions according to adjustments defined during development of the engine.

Nevertheless, identically designed elements that execute elementary functions may exhibit differences or dispersions due either to dispersions in the manufacture of the executing elements or to different aging of the executing elements. In the case of an actuator, the position of two identical actuators exhibiting a dispersion can be different for the same control signal. In the case of two identical sensors exhibiting a dispersion, a delivered measured signal can be different for the same real physical variable sensed by the sensor. Such dispersions in the elements that execute elementary functions interfere with satisfactory control of the internal combustion engine and of exhaust-gas purifying means for preventing the emissions of polluting gases, or at least decreasing them as much as possible. Such dispersions may cause dispersions in pollutant emissions from one vehicle to another, in turn leading to higher development and manufacturing costs in order to ensure that each vehicle complies with the defined pollutant emission levels.

The object of the present invention is a method for controlling elements that execute elementary functions of internal combustion engines, making it possible to compensate for dispersions that may affect the executing elements as a result of the manufacture or aging thereof.

The present invention also relates to a method, for controlling elements that execute elementary functions necessitating minor modifications to a monitoring and control assembly of an internal combustion engine, that can be implemented easily and without prohibitive extra cost.

In such a method for controlling elements that execute elementary functions of internal combustion engines, the elements are controlled by means of measured signals delivered by sensors, theoretical signals that should be delivered by reference sensors at the current operating point of the engine are determined, the differences between the theoretical signals and the signals measured by reference sensors are determined, and instructions for correction of signals intended for or delivered by the elements are created as a function of the calculated differences.

Elements that execute elementary functions are generally and not limitatively actuators/activators and sensors used for monitoring and control of the operation of the internal combustion engine. In the case of actuators, the correction instructions for control signals of the elements can be directly corrected control signals or correction signals intended to be added in the manner of an "offset" or shift to control signals created elsewhere by a control unit provided for normal operation of the combustion engine. In the case of sensors, the correction instructions may be the application of a shift or "offset" value or of a gain to the measured signals delivered by the sensors.

By determination of differences between the theoretical signals and the signals effectively measured by reference sensors used to control the internal combustion engine, it is possible to take into account dispersions that the elements that execute elementary functions associated with the internal combustion engine such as actuators or sensors (including reference sensors), may exhibit relative to theoretical measured signals that should have been delivered by the reference sensors under the same operating conditions. The theoretical signals can be determined during development of the internal combustion engine, for example on the basis of a reference engine. It will be possible to use the control method for all internal combustion engines of identical design.

The reference sensors may advantageously be sensors for measuring the exhaust-gas composition, such as one or more oxygen sensors and/or one or more nitrogen oxide sensors disposed on the exhaust line of the internal combustion engine. The measured signals delivered by such sensors are directly related to the pollutant emissions.

The operating point of the engine can be determined as a function of the engine speed and of the engine load, and also as a function of a temperature of the engine-cooling fluid. It will be possible to use any measurement or variable having a significant influence on the reference measurements.

In one embodiment, the theoretical measured signals that should be delivered by a reference sensor are determined on the basis of a table established beforehand for particular operating points. The operating points chosen for establishment of the table are preferably operating points for which the variation of pollutant emissions is greatest as a function of dispersions that may appear in the elements that execute elementary functions.

The correction instructions for control signals of an element can also be determined on the basis of a table established beforehand for particular operating points.

To ensure that the creation and application of correction instructions for control signals do not lead to instability in regulation of the control of an internal combustion engine, provisions can be made to filter a difference signal between the theoretical sensor signals and the measured sensor signals, before determining correction instructions, in order to lengthen a reaction time or a time for application of correction instructions in such a way as to adapt the reaction time of the correction to a characteristic response time of the internal combustion engine and its executing elements.

Elements that execute elementary functions can be advantageously chosen among an exhaust-gas recirculation valve, an injector, a solenoid valve for controlling the turbine geometry of a turbo device, a pressure sensor in a common fuel-supply rail, a flow sensor in an air-supply line or an air-intake butterfly valve, or an intake pressure sensor.

The invention also relates to a drive assembly comprising an internal combustion engine and elements, including reference sensors, that execute associated elementary functions, and a control unit, characterized in that the control unit is equipped with means for comparing measured signals originating from reference sensors with theoretical measured signals at the operating point of the engine, and with means for determining correction instructions for control signals of the executing elements as a function of the difference between the measured signals originating from reference sensors and the theoretical measured signals.

The invention also relates to a motor vehicle equipped with such a drive assembly.

Figure 2:
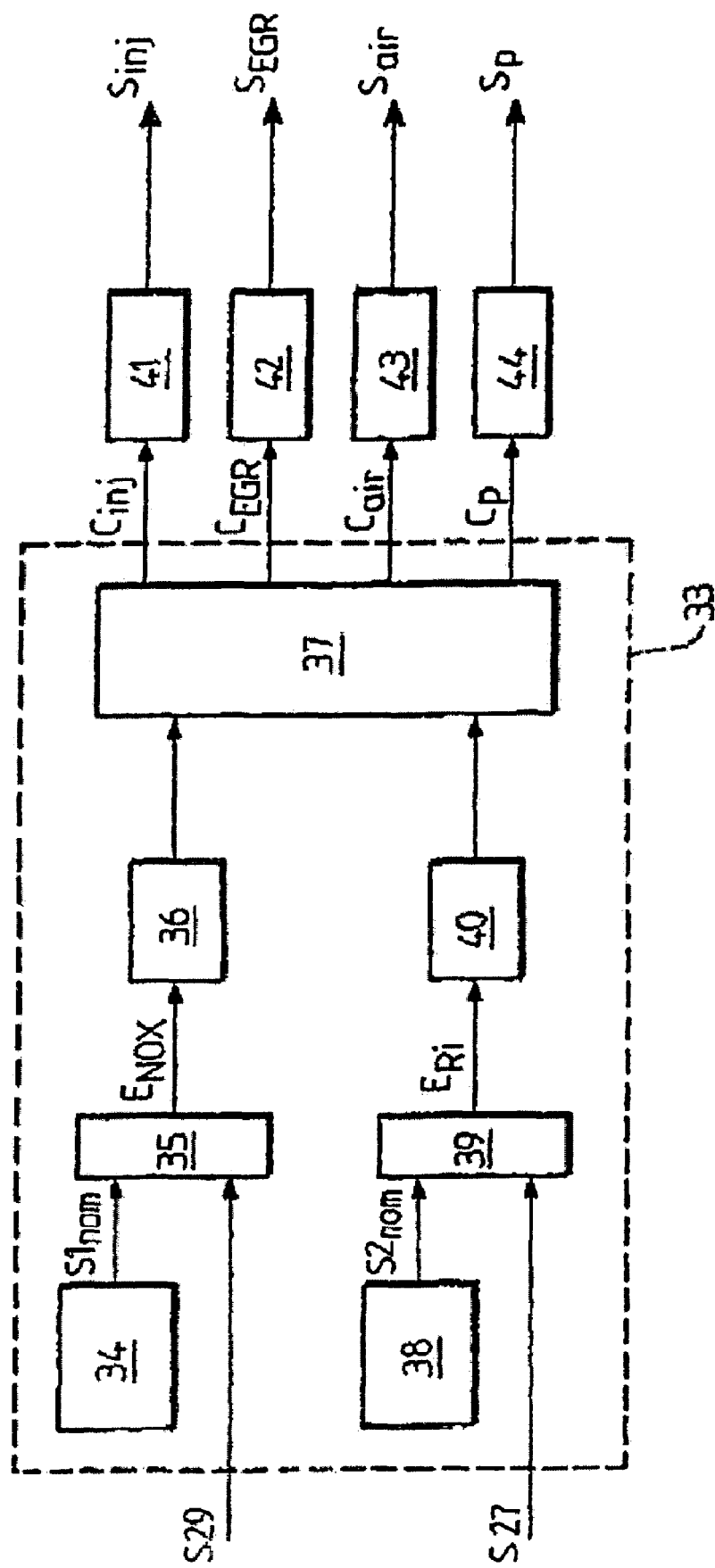

The present invention and its advantages will be better understood by studying the detailed description of one embodiment taken by way of example that is in no way limitative and is illustrated by the attached drawings, wherein:

FIG. 1 is a schematic general diagram of an internal combustion engine, equipped with elements for execution of elementary functions controlled by a control unit; and FIG. 2 is a block diagram illustrating modules of a control unit, especially for creation of correction instructions.

In FIG. 1, a drive assembly referenced as a whole by 1 comprises an internal combustion engine 2, an air-intake line 3, an exhaust line 4, a fuel-supply device 5 and a control unit 6.

Internal combustion engine 2 comprises combustion chambers or cylinders 7, in this case four, represented by dotted circles.

Supply line 3 comprises an intermediate supply conduit 8 discharging at one end into an intake manifold 9 having one inlet and four outlets to distribute an intake-air flow in combustion chambers 7, and equipped on the opposite end with an intake-air flow-control element 10 in the form of an intake butterfly valve 11 disposed between intermediate conduit 8 and an air intake, not illustrated in the drawing. The position of butterfly valve 11 can be controlled by means of an actuator (not illustrated).

Exhaust line 4 comprises an intermediate exhaust conduit 12, one inlet of which is connected to an exhaust manifold 13 with four inlets and one outlet, to collect and channel an exhaust-gas flow emerging from cylinders 7 of engine 2, an outlet of intermediate exhaust conduit 12 being connected to an exhaust-gas purifying means 14, disposed upstream from a terminal outlet of exhaust line 4, not illustrated in the figure. By way of non-limitative example, the exhaust-gas purifying means can be chosen from among a catalytic converter, a particle filter or a nitrogen oxides trap. A plurality of purifying means can be envisioned simultaneously.

An exhaust-gas recirculation conduit 15 is disposed between intake line 3 and exhaust line 4. Recirculation conduit 15 discharges at one end into intermediate exhaust conduit 12 and at the opposite end into intermediate intake conduit 8. An exhaust-gas flow in recirculation conduit 15, from intermediate exhaust conduit 12 to intermediate intake conduit 8, is controlled by means of an exhaust-gas recirculation valve 16 disposed on an intermediate portion of recirculation conduit 15.

Fuel-supply device 5 comprises a fuel tank 17, a common rail 18 and injectors 19, in this case four, provided for injection of fuel directly into cylinders 7 of engine 2. Common rail 18 is connected to tank 17 via a supply conduit 20, and by a supply system 21 connecting supply conduit 20 to tank 17. As an example that is in no way limitative, supply system 20 can comprise a high-pressure supply pump, itself supplied from the tank by a low-pressure pump or "supercharger" pump. Injectors 19 are connected to common rail 18 via injection conduits 22. Supply system 21 is controlled in such a way that it fills common rail 18 with fuel and maintains a setpoint pressure in common rail 18, serving as pressure reserve for the supply of each of injectors 19.

Drive assembly 1 comprises a turbo device comprising a turbine 45 disposed on intermediate exhaust conduit 12 downstream from exhaust manifold 13, turbine 45 driving, by means of a turbo shaft 46, represented schematically by a line, a compressor 47 disposed on intermediate intake conduit 8, upstream from intake manifold 9. In a manner known in itself, the turbo device is equipped with a solenoid valve 48 for controlling the turbine geometry, disposed on turbine 45.

Control unit 6 is designed to create control signals for butterfly valve 11, supply pump 21, injectors 19, recirculation valve 16 and solenoid valve 48 for controlling the turbine geometry.

Control unit 6 is connected via control links 23, 24, 25, 26 and 50 respectively to an actuator that controls the position of butterfly valve 11, to supply pump 21, to injectors 19, to recirculation valve 16 and to solenoid valve 48 for controlling the turbine geometry.

Control unit 6 uses, for creation of control signals, measured signals originating from a set of sensors, including a first oxygen sensor 27 situated on exhaust line 4 downstream from purifying means 14, a second oxygen sensor 28 disposed on exhaust line 4 upstream from purifying means 14, a nitrogen oxide sensor 29 disposed on intermediate exhaust conduit 12 in order to indicate the concentration of nitrogen oxide and oxygen in the exhaust gases, a sensor 30 for determining the pressure prevailing in common rail 18, a flow sensor 31 for determining the air flowrate upstream from butterfly valve 11, and a pressure sensor 51 in intake manifold 9. Control unit 6 is connected to these sensors 27 to 31 via measuring links 32.

It is of course provided that appropriate sensors will be used, as a function of the elements of drive assembly 1. In particular, it will be possible to provide sensors associated with different purifying means 14, depending on the type of purifying means used (catalyst, particle filter, nitrogen oxides trap). The sensors associated with the purifying means will have the form of oxygen sensor, nitrogen oxides sensor, temperature sensor, pressure sensor, etc. In addition, it will be possible to provide that one sensor can combine a plurality of functions. In particular, it will be possible to use a single sensor to simultaneously measure the concentrations of oxygen and nitrogen oxides in the exhaust gas.

During operation, control unit 6 receives measured signals from first and second oxygen sensors 27, 28, from nitrogen oxide sensor 29, from pressure sensor 30, from flow sensor 31 and from pressure sensor 51 of intake manifold 9. On the basis of these measurements and of any other signal necessary or useful for controlling the internal combustion engine, such as the position signal of an accelerator pedal, the speed of rotation of the engine or the load applied to the engine, or a coolant fluid temperature, etc., control unit 6 creates signals for control of butterfly valve 11, pump 21, injectors 19, recirculation valve 16 and solenoid valve 48 for controlling the turbine geometry. Control unit 6 determines the control signals as a function of algorithms and maps predetermined and developed for drive assembly 1.

FIG. 2 is described hereinafter using the same numerical references as were used for FIG. 1.

A set of corrections 33, designed to be inserted into control unit 6, for example in the form of software stages, comprises a nitrogen oxides map 34 in the form of a table established beforehand and delivering, as a function of the current operating point of the engine, a theoretical measured signal that should be delivered by nitrogen oxide sensor 29.

Comparator 35 receives at the input the theoretical measured nitrogen oxide signal $S1_{nom}$ and the measured signal S29 originating from nitrogen oxide sensor 29, and delivers at the output the nitrogen oxides measurement error $E_{NOx}$, defined as the difference between the theoretical measured nitrogen oxide signal $S1_{nom}$ and the measured nitrogen oxide signal S29. The nitrogen oxides measurement error $E_{NOx}$ is filtered in a filter 36 then sent to the input of a correction module 37.

An oxygen-concentration mapping module 38 delivers a theoretical measured signal of the exhaust-gas oxygen concentration that should be delivered by oxygen sensor 27 as a function of the current operating point of the internal combustion engine.

The theoretical measured signal $S2_{nom}$ of the oxygen concentration is transmitted to a comparator 39, which also receives at the input the measured signal S27 originating from the first oxygen sensor, and which delivers at the output an oxygen concentration error $E_{Ri}$, defined as the difference between the theoretical measured signal $S2_{nom}$ of the oxygen concentration and the measured signal S27 originating from the first oxygen sensor. The oxygen-concentration error signal $E_{Ri}$ is passed through a filter 40 then transmitted as a second input to correction stage 37.

Correction stage 37 comprises maps with three inputs and one output, each map receiving at the input the nitrogen oxide error $E_{NOx}$, the oxygen-concentration error $E_{Ri}$ and the current operating point of the engine, and delivering at the output a correction instruction intended for a particular executing element.

Correction stage 37 in this case has four outputs: a first output for correction instructions $C_{inj}$ transmitted to an injection-flow control module 41 provided for creation of an injector-control signal $S_{inj}$, a second output for recirculation-correction instructions $C_{egr}$ transmitted to a control module 42 provided for creation of a control signal $S_{egr}$ for exhaust-gas recirculation valve 16, a third output for correction instructions $C_r$ transmitted to an air-flow control module 43 provided for creation of a control signal $S_r$ for modification of a transfer function applied to the output signal of intake-air flow sensor 31, and a fourth output for correction instructions $C_p$ transmitted to a control module 44 for creation of a control signal $S_p$ for modification of the transfer function applied to an output signal of pressure sensor 30 of common rail 18.

Control modules 41 to 44 are provided during development of the drive assembly for creation of nominal control signals in the case in which no dispersion exists and for ensuring that the correction instructions can be applied. The correction instructions can advantageously be presented in the form of gain values or of values provided to be added to a nominal control signal of an element determined by the control module.

The predetermined maps or tables used for creation of correction instructions can be established during the development of drive assembly 1, on the basis of an engine used as reference for engines of identical design. To accomplish this, one possible method for determining maps comprises the stages described hereinafter.

In a first step, a reference engine to be used for development is selected. On the basis of this reference engine, there are established reference maps, or in other words tables that indicate, for what are known as "learning" operating points, the so-called "theoretical" measured signals delivered by reference sensors; that is, in the embodiment described in the foregoing, a reference map of the oxygen concentration in the exhaust gases and a reference map of the nitrogen oxides concentration in the exhaust gases.

Then, dispersions or errors in the executing elements (actuators/sensors) are artificially introduced into this reference engine. Preferably there are introduced dispersions corresponding to the maximum characteristic dispersions that have been observed for each executing element. Different values of dispersions can be introduced for each executing element, and dispersions can be introduced into a plurality of executing elements simultaneously, in different combinations. They could be referred to as "sets of dispersions". At each learning operating point and for each set of dispersions, the measured signals delivered by the reference sensors are then recorded in a map referred to hereinafter as the "influencing" map. In this way the measurements delivered by the reference sensors are known for each set of dispersions at each learning operating point.

It will be noted that very many sets of dispersions exist and therefore that very many measurements must be made. To reduce the number of measurements to be made, it is possible to select certain learning operating points and certain sets of dispersions. Preferably there will be chosen configurations for which the influences on pollutant emissions are the greatest, to ensure that the capability for correcting such cases is subsequently achieved. To accomplish this, it is possible in known manner to provide for implementation of experimental plans.

In a subsequent step there are determined, for each point of the influencing map, each corresponding to one learning operating point of the engine and one set of dispersions, the differences relative to the reference measurements, or in other words the differences between the theoretical measured signals at the said operating point (compare with reference map) and the measured signals obtained and recorded in the influencing map.

In a subsequent step, a correction map is created for each executing element, the said correction map determining the correction instructions for the said executing element, specifically for pairs comprising one learning operating point and one set of differences relative to the theoretical measurements. To accomplish this there is determined, in the influencing map, for each pair comprising one learning operating point and one set of differences relative to the theoretical measurements, that set of dispersions which corresponds thereto, in order to deduce therefrom those correction instructions to be applied which can correspond simply to the set of dispersions.

Nevertheless, it is possible for several corresponding sets of dispersions to exist for one pair comprising one learning operating point and one set of differences relative to the theoretical measurements. If so, several solutions exist that can be envisioned for combinations of corrections applied to one or more executing elements. For each pair comprising one operating point and one set of differences relative to the theoretical measurements, it is advantageous to choose explicitly that which is the correction to be applied. It will be possible to use other determining criteria to accomplish this. For example, there could be chosen as criterion that combination of corrections which leads to the smallest fuel consumption. Other criteria could be provided. There could also be provided an algorithm capable of choosing one set of corrections among a plurality of sets that can be envisioned, as a function of particular criteria, whether for development or in real time, by means of an on-board module.

Then, when the correction maps have been established, they are recorded in correction module 37 (FIG. 2). The reference maps are recorded in the modules for reference maps 34, 38 (FIG. 2).

By operating at one operating point of the internal combustion engine, the differences relative to the theoretical measurements are determined for the reference sensors. In this way there is obtained the set of differences relative to the theoretical measurements, and the correction instructions to be applied to each element that executes the elementary functions in question are found in the correction maps.

An embodiment in which the reference measured signals are the nitrogen oxides concentration in the exhaust gases and the oxygen concentration in the exhaust gases has been described. Of course, it would also be possible to provide for the use of other reference measured signals, alone or in combination. By increasing the number of reference measured signals, it may be possible to better differentiate the different scenarios of dispersion as a function of an operating point and of a set of differences.

Moreover, the invention is not limited to the cases in which the correction instructions concern actuators. The correction instructions can also be applied to sensors, in order to compensate for or correct a measured signal that seems erroneous. The control instructions can be applied in particular to the reference sensors.

Nor is the invention limited to the embodiment described in the foregoing. Control and monitoring of an internal combustion engine involve numerous executing elements other than those cited by way of example in no way limitative, and usable in a method according to the invention.

By virtue of the invention, there is obtained a method for controlling elements that execute elementary functions of an internal combustion engine, making it possible to compensate for and correct dispersions present originally or due to aging and that can disturb an operation of the engine or of associated elements, and in particular pollutant emissions.

The invention claimed is:

1. A drive assembly comprising:
   an internal combustion engine;
   elements, including reference sensors, that execute associated elementary functions; and
   a control unit, including means for comparing measured signals originating from the reference sensors with theoretical measured signals at an operating point of the engine, and including means for determining correction instructions for signals for the elements as a function of a difference between the measured signals originating from the reference sensors and the theoretical measured signals.

2. A motor vehicle equipped with a drive assembly according to claim 1.

3. A method for controlling elements that execute elementary functions of an internal combustion engine, wherein the elements are controlled by measured signals delivered by sensors, the method comprising:
   determining theoretical signals that should be delivered by reference sensors at a current operating point of the engine;
   calculating differences between the theoretical signals and the signals measured by the reference sensors; and
   creating correction instructions for signals for the elements as a function of the calculated differences.

4. A method according to claim 3, wherein at least one of the reference sensors is an oxygen sensor disposed on an exhaust line of the internal combustion engine.

5. A method according to claim 3, wherein at least one of the reference sensors is a nitrogen oxide sensor disposed on an exhaust line of the internal combustion engine.

6. A method according to claim 3, further comprising:
   determining the operating point of the engine as a function of engine speed, of engine load, and of a temperature of an engine-cooling fluid.

7. A method according to claim 3, wherein the theoretical measured signals that should be delivered by the reference sensors are determined based on a reference map or table established beforehand for particular operating points.

8. A method according to claim 3, wherein the correction instructions for control signals of an element are determined based on a correction map or table established beforehand for particular operating points.

9. A method according to claim 3, wherein a difference signal between the theoretical measured signals and the measured sensor signals is filtered before correction instructions are determined, to lengthen a reaction time or a time for application of the correction instructions.

10. A method according to claim 3, wherein at least one executing element is chosen among: an exhaust-gas recirculation valve, an injector, a solenoid valve for turbine geometry of a turbo device, a pressure sensor in a common fuel-supply rail, a flow sensor in an air-supply line or an air-intake butterfly valve, or a pressure sensor in an intake manifold.

* * * * *